June 15, 1965   D. J. MacGREGOR   3,189,810
MOTOR CONTROLLER
Filed May 23, 1961   2 Sheets-Sheet 2

_United States Patent Office_

3,189,810
Patented June 15, 1965

1

3,189,810
MOTOR CONTROLLER
Dean J. MacGregor, Amherst, N.Y., assignor to Westinghouse Electric Corporation, East Pittsburgh, Pa., a corporation of Pennsylvania
Filed May 23, 1961, Ser. No. 112,068
15 Claims. (Cl. 318—227)

The present invention relates generally to motor controllers and more particularly to a static motor controller for limiting inrush current during starting of an alternating current motor.

In many applications the inrush current of an alternating current motor during full voltage starting produces undesirable fluctuations in the supply voltage. In such cases, it is a normal practice to reduce the inrush current by inserting series impedance in the motor line, or to reduce the motor terminal voltage with suitable transformers. In either case, the current limiting device is removed from the circuit by some switching device when the motor is completely accelerated. The transient which results during switching is frequently a more severe disturbance on the power supply system than occurs when the motor is initially connected.

An object of the present invention is to provide a new and improved electrical controller for limiting inrush current during starting of an alternating current motor.

Another object of the present invention is to provide a motor controller capable of avoiding undesirable switching surges during acceleration of the motor.

Another object of the present invention is to provide a motor controller which will be compact, light in weight, and reliable through the use of static devices requiring little or no maintenance.

Another object of the present invention is to provide a motor controller capable of accurately limiting motor inrush current to a preselected value until the motor accelerates sufficiently to reduce inrush current to a safe operating level.

Further objects and advantages of the present invention will be readily apparent from the following detailed description taken in conjunction with the drawing in which.

Figure 1:
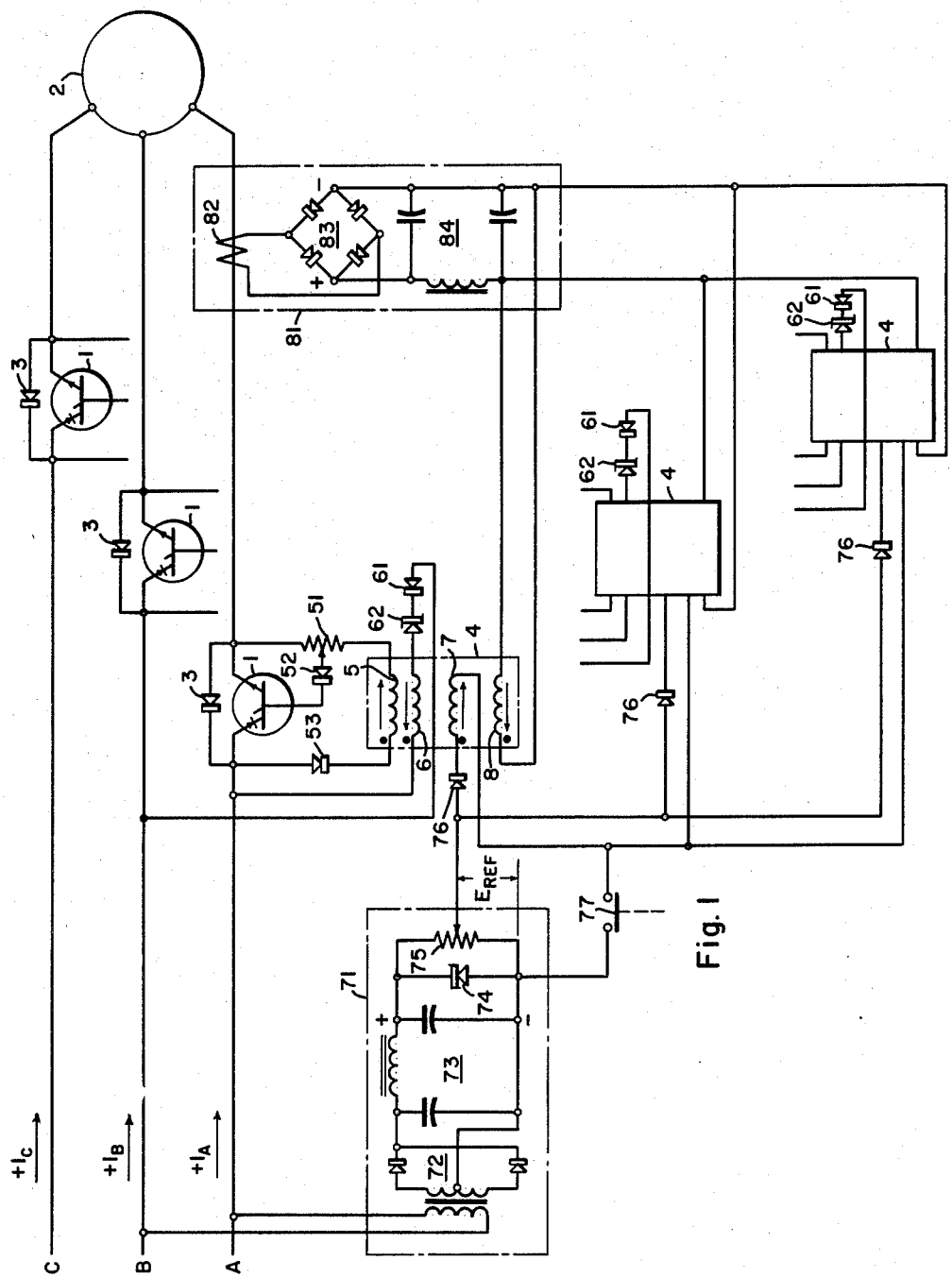
FIGURE 1 is an electrical schematic diagram of an illustrative embodiment of the present invention.

The motor controller in accordance with the present invention shown in FIG. 1 is illustrated as including a semiconductor device 1 for each power line A, B, C to an alternating current motor 2.

It is to be understood that the semiconductor device 1 is utilized in a switching mode and has a breakover voltage characteristic, which breakover can be reduced to a very low magnitude of voltage in response to a gating signal to the semiconductor device. In other words, if a potential is applied to the device 1 in a predetermined direction, herein designated as a positive polarity voltage, a negligible current will flow even when the positive voltage is of substantial magnitude. If, however, a small gating signal or current is applied to the device 1, the breakover level can be reduced to very low magnitude of voltage. Once the breakover voltage level has been exceeded, the device 1 fires and becomes highly conductive, sustaining a very high current flow with very little voltage thereacross. In such a manner, the device 1 simulates a switch in the closed position. Of course, any suitable semiconductor device having these characteristics may be utilized in the present invention.

The semiconductor device 1 for each power line is poled to block current towards the motor 2 in the absence of a gating signal to the device. As seen in FIG. 1, the semiconductor device 1 has therein a load current path which is in series with the associated line, and is gated to pass power through the line toward the motor when the device 1 is fired by a gating signal. Means are connected across each semiconductor device to allow current from the motor 2 and is herein illustrated as a rectifier 3.

In accordance with the present invention, phase shift control of the semiconductor devices 1 is provided to limit the inrush current during starting of the motor 2. The regulating means for varying the firing angle of the semiconductor devices 1 is illustrated as a saturable core 4 having winding means inductively disposed thereon including a first winding 5, a second winding 6, a third winding 7, and a fourth winding 8. For simplicity, the details of the regulating means for only one phase, namely phase A, has been shown. It will be seen that the regulating means for each other phase is similarly connected except its associated second winding 6 for phase B is connected across line-to-line voltage $-E_{BC}$; and for phase C, across voltage $-E_{CA}$.

The first winding 5 on the magnetic core 4 is connected across the semiconductor device 1 with a variable series resistor 51 to limit the current after saturation of the core 4. The saturable core 4, if unsaturated, will be driven toward positive saturation by the voltage across the device 1 but no appreciable voltage will appear across the resistor 51, and no firing current or gating signal will result in the gate terminal of the semiconductor device. The core is chosen to require more volt-seconds to saturate than are obtained in a half cycle of the voltage across a blocking semiconductor device. Of course, if the core 4 becomes saturated during the half cycle, voltage will appear across the resistor 51 and fire the semiconductor device 1. Rectifiers 52 and 53 block any current in the opposite direction in the first winding 5 and the gate terminal of the semiconductor device 1.

When current in power line A reverses, current is allowed around the semiconductor device 1 through the rectifier diode 3 paralleling the semiconductor device. The core 4 is now positively saturated, or nearly so, depending on whether the semiconductor device 1 was fired or not. Since the forward voltage drop across the rectifier diode 3 is low, the voltage across the first winding 5 is much too small to reset the core 4. Hence a second winding 6 is required for resetting the core 4. The winding 6 is connected across power lines A and B thereby having line to line voltage $E_{AB}$ thereacross. A diode 61 allows current flow only during the negative half cycle of the line to line voltage $E_{AB}$. A Zener diode 62 further restricts current flow in the winding 6 to an interval when the instantaneous line-to-line voltage $E_{AB}$ exceeds a predetermined percentage of its peak value, herein chosen to be one-half the peak value.

Figure 2:
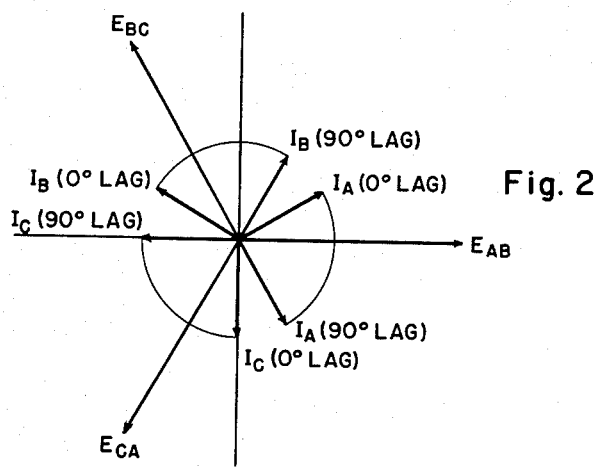
FIGURE 2 is a vector diagram of the three-phase current and voltage relationships of an alternating current motor.

FIG. 2 illustrates the three-phase relationships of line current and phase voltage for an alternating current motor and further illustrates how the line current $I_A$, $I_B$, and $I_C$ varies with the power factor of the system. It can be seen that a purely resistive load will result in the line current leading the line-to-line voltage. A purely inductive load accordingly lags the line-to-line voltage by 60°.

Figure 3:
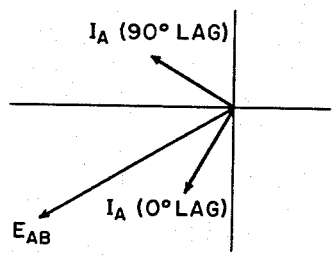
FIGURE 3 is a characteristic vector diagram of a selected phase of an alternating current motor at the beginning of a predetermined time interval when utilizing the present invention.

Considering more particularly for purposes of clarity FIG. 3 wherein phase A voltage and current positions only are illustrated, it can be seen that when the reference value provided by the Zener diode 62 is exceeded and should the connected load be purely inductive, which is very seldom the case with an alternating current motor load, the current through the semiconductor device would still be in the forward direction toward the motor. Since it is not possible to fire the semiconductor device while the core is being reset, conduction cannot be initiated over the last 30° of the positive half cycle of line current. Conduction initiated during this interval gives an average current of only approximately 6 percent of the normal average current or less and therefore is of inconsequential magnitude with respect to motor actuation. Therefore, the time interval for resetting the core 4 can commence when the line to line $E_{AB}$ is as shown in FIG. 3.

Figure 4:
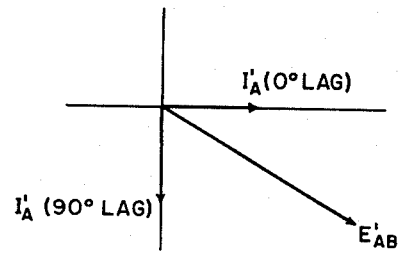
FIGURE 4 is a characteristic vector diagram of the same selected phase of the alternating current motor at the conclusion of a predetermined time interval when utilizing the present invention.

In FIG. 4 the phase A voltage and current are primed to indicate the end of the resetting portion of the cycle. With the same Zener breakdown voltage reference operative, it can be seen that the semiconductor device 1 can be fired at the very beginning of its positive half cycle since the line current $I_A'$ when at zero degrees lagging, will only become positive when the line-to-line voltage $E_{AB}'$ becomes less than the Zener breakdown value. Hence, the resetting of the core is ceased in time to allow firing of the semiconductive device as the line current $I_A'$ starts positive even with the severest conditions of zero degrees lag.

The firing angle of the semiconductor devices 1 is determined by the effect of windings 7 and 8 on the flux density of the magnetic core 4.

Winding 7 is energized by a filtered direct current reference source 71 connected across a line-to-line voltage. The reference voltage source 71 comprises a full wave rectifier circuit 72, filtered by the network 73 and held constant to a predetermined reference value as established by a Zener diode 7. A portion of the voltage across the Zener diode 74 is established as the reference voltage $E_{REF}$ for energizing the winding 7 by means of a variable resistor 75.

A diode 76 in series connection with winding 7 prevents reverse current flow while the saturable core 4 is gating. Such a reference voltage source 71 is used to bias all three saturable cores or a separate reference voltage source may be provided for each phase. The direct current reference voltage is regulated by the Zener diode 74 so that fluctuations of the alternating current power voltage do not affect its magnitude.

A signal voltage source 81 energizes the fourth winding 8. The current in winding 8 is developed proportional to the line current by means of a current transformer 82 and a full wave bridge rectifier 83. A filter network 84 reduces the ripple of the rectified signal. Three such signal voltage sources 81 may be used each to measure line current for its associated regulating means or a single circuit may be used as illustrated to supply all three saturable cores. The direct current developed by the signal voltage source is applied to winding 8 with a polarity such that it opposes the ampere-turns of winding 7.

At the time of installation, the reference voltage $E_{REF}$ is adjusted by means of the variable resistor 75 to a magnitude indicative of the maximum desired or safe operating value of line current. When control contacts 77 are first closed, current through winding 7 completely saturates the core 4 in a positive direction so that semiconductor device 1 is fired at the beginning of the positive half cycle of the line current. This allows almost an entire cycle of current to flow in the line since the negative half cycle of the line current is shunted around the semiconductor device 1 by means of the parallel connected diode 3. Upon start up of the motor the line current is large in magnitude and induces current flow in winding 8. If the line current exceeds the maximum desired magnitude as determined by the setting of the variable resistor 75, the current in winding 8 will cancel a part or all of the ampere turns of winding 7 so that on the next half cycle of the line current the firing of the semiconductor device 1 will be delayed until winding 5 can supply the necessary volt-seconds to complete saturation of the core in the positive direction. Thus, the firing point will be moved to a firing angle later in the cycle thereby reducing the average value of line current.

Figure 5:
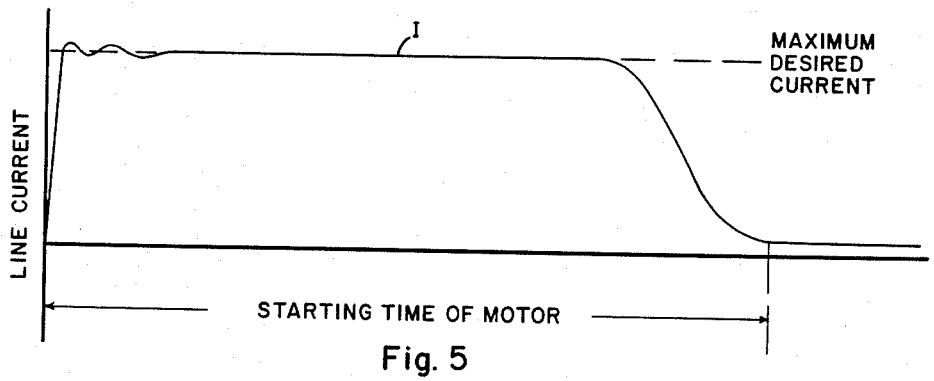
FIGURE 5 is a characteristic curve of results obtainable with the present invention.

The firing angle of the semiconductor device 1 will be regulated so that the desired average value of line current continues to flow as the motor accelerates. As the motor attains running speed, the line current will decrease and the constant reference current in winding 7 will saturate the core 4 causing the semiconductor device 1 to fire over a complete half cycle of the line current. The resultant variation of line current over the starting time of the motor can be seen in FIG. 5 wherein the current I is maintained at the maximum allowable level as the motor accelerates until the motor approaches running speed whereupon the line current will be greatly reduced. When the line current is greatly reduced, the firing angle of the semiconductor device 1 can be accordingly decreased so that conduction is allowed for a larger and larger portion of the positive half cycle of line current until finally the semiconductor device 1 is fired at the beginning of each positive half cycle of the line current thereby allowing the entire half cycle of line current to the motor 2. It is to be noted that the starting current is accurately limited to a preset value until the motor accelerates sufficiently to reduce the current below the preset value at which time full voltage operation is obtained without any switching disturbances to the power supply.

Opening of the control contact 77 by any suitable means such as a stop push-button connected in a conventional control circuit will interrupt the flow of current through winding 7 of each phase. Since the half cycle of voltage across winding 5 is insufficient to satuate the core 4, no gating signal will result so the breakover level of each semiconductor device 1 returns to a level in excess of the voltage appearing thereacross from the power supply. Each device 1 once again blocks current toward the motor.

The present invention provides means for limiting the inrush current to an alternating current motor during starting without incurring undesirable switching surges to disturb the power supply. At the same time, the motor 2 is protected from excessive inrush current which could be detrimental to its safe operation.

While the present invention has been described with a particular degree of exactness for the purposes of illustration, it is to be understood that the invention is not limited to the specific details shown, but in its broadest aspects include all equivalent embodiments, alterations, and modifications which come within the spirit and scope of the invention.

I claim as my invention:

1. In a control system for a polyphase alternating current motor having an input power line for each phase of the motor, in combination: a semiconductor device connected in each of said power lines for supplying power through the device to said motor; each said semiconductor device having switching characteristics responsive to a gating signal; a regulating means for each of said devices, each regulating means including a saturable core; means for driving said core towards saturation in a predetermined sense during alternate half cycles of voltage to said motor; each regulating means providing a gating signal to its associated semiconductor device at a time depending on the flux condition in said core at the beginning of said alternate half cycles; means for resetting said core during a portion of the intermediate half cycles; biasing means for biasing said core to saturation in said predetermined sense; and means responsive to current supplied to said motor for limiting motor current, the latter means including means for opposing said biasing means in response to motor current.

2. A current limiting starter for an alternating current motor comprising, in combination: a semiconductor switching device for each power line to said motor, through which device power is supplied to the motor; each said semiconductor switching device having a directional conductive state responsive to a gating signal; rectifier means for each power line poled to allow conduction in the opposite direction across said respective switching device; regulating means, including a saturable core and winding means inductively disposed thereon, for providing said gating signal to each said device at a time during alternate half cycles of line voltage to said motor determined by the flux condition of said core prior to each alternate half cycle; said winding means including a first winding and a second winding; means connected to said first winding for driving said core to saturation in said predetermined sense during the alternate half cycles of voltage to said motor; means connected to said second winding for driving said core toward saturation in the opposite sense during intervening half cycles; and means responsive to the line current for opposing said last mentioned means connected to said first winding.

3. A current limiting starter for an alternating current motor comprising, in combination: a semiconductor switching device for each power line to said motor, through which device power is supplied to the motor; each said semiconductor switching device having a directional conductive state response to a gating signal; rectifier means for each power line poled to allow conduction in the opposite direction across said respective switching device; regulating means, including a saturable core and winding means inductively disposed thereon, for providing said gating signal to each said device at a time during alternate half cycles of line voltage to said motor determined by the flux condition of said core prior to each alternate half cycle; said winding means including a first winding and a second winding; means connected to said first winding for driving said core to saturation in said predetermined sense during the alternate half cycles of voltage to said motor; means connected to said second winding for driving said core toward saturation in the opposite sense during intervening half cycles; Zener breakdown means for limiting conduction through said second winding to a preselected portion of each said intervening half cycle; and means responsive to the line current for opposing said means connected to said first winding.

4. A current limiting starter for an alternating current motor having input power leads for the receipt of supply voltage comprising, in combination; a semiconductor switching device for each power lead to said motor, through which device power is supplied to the motor; each said semiconductor switching device having adjustable breakover characteristics responsive to a gating signal; regulating means for each said switching device, including a saturable core and winding means inductively disposed thereon, for varying the timing of the gating signal to each said switching device; said winding means including means for driving said core to saturation in a predetermined direction during predetermined half cycles of supply voltage and thereafter providing a gating signal to each said device in accordance with the flux condition in said core prior to driving said core to saturation, means for driving said core to saturation in the opposite direction during the opposite half cycle of supply voltage to said motor, means for biasing said core to saturation in said predetermined direction, and means responsive to the line current for driving said core towards saturation in the opposite direction.

5. The apparatus of claim 4 wherein said winding means includes current limiting means for limiting gating current to each said device after saturation of said core.

6. In a control system for an alternating current load having an input voltage line for the load, a gateable semiconductor device having a load current path connected in series with said line, through which device power is supplied to the load when the device is gated, said device when ungated blocking current flow therethrough, said device being gateable during half cycles of predetermined polarity of the voltage on said line to a unidirectional conductive state in response to a gating signal, a saturable core, means responsive to the saturation of said core in a predetermined sense for applying a gating signal to said device, a winding inductively related to said core, a circuit connected across said device and responsive to voltage half cycles thereacross of said predetermined polarity for driving said core toward saturation in said predetermined sense, said circuit including said winding and series rectifier means poled to pass current during said predetermined polarity half cycles, means for biasing said core toward saturation in said opposite sense, means providing a reference signal representing a maximum desired load current value, means providing a second signal responsive to the load current, and means responsive to said reference and second signals for applying to said core control forces having respective components due to said reference and second signals, said components being oppositely related to each other, said component due to said reference signal acting in a direction tending to saturate said core in said predetermined sense.

7. In control apparatus for a polyphase alternating current load having an input voltage line for each phase of the load, a plurality of regulating systems, one for each of said lines, each of said regulating systems comprising a gateable semiconductor device having a load current path connected in series with its associated line, through which device power is supplied to the load when the device is gated, said device when ungated blocking current flow therethrough, said device being gateable during half cycles of predetermined polarity of the voltage on its associated line to a unidirectional conductive state in response to a gating signal, rectifier means connected across said device for passing current in the opposite direction through said associated line during the intervening opposite polarity half cycles of voltage on the line, a saturable core, means responsive to the saturation of said core in a predetermined sense for applying a gating signal to said device, a winding inductively related to said core, a circuit connected across said device and responsive to voltage half cycles thereacross of said predetermined polarity for driving said core toward saturation in said predetermined sense, said circuit including said winding and series rectifier means poled to pass current during said predetermined polarity half cycles, means providing a reference signal representing a maximum desired load current value, means providing a second signal responsive to the load current, and means responsive to said reference and second signals for applying to said core magnetic control forces having respective components due to said reference and second signals, said components being oppositely related to each other, said component due to said reference signal acting in a direction tending to saturate said core in said predetermined sense.

8. In a control system for an alternating current motor having an input voltage line for the motor, a gateable semiconductor device having a load current path connected in series with said line, through which device power is supplied to the motor when the device is gated, said device when ungated blocking current flow therethrough, said device being gateable during half cycles of predetermined polarity of the voltage on said line to a unidirectional conductive state in response to a gating signal, a saturable core, first means responsive to the saturation of said core in a predetermined sense for applying a gating signal to said device, a winding inductively related to said core, a circuit including said winding connected across said device and responsive to voltage across the device for driving said core toward saturation, second means for driving said core toward saturation in said predetermined direction in response to a reference signal respresenting a maximum desired motor current value, and third means responsive to motor current for opposing said second means.

9. In a control system for an alternating current motor having an input voltage line to the motor, a gateable semiconductor device having a load current path connected in series with said line, through which device power is supplied to the motor when the device is gated, said device when ungated blocking current flow therethrough, said device being gateable during half cycles of predetermined polarity of the voltage on said line to a unidirectional conductive state in response to a gating signal, rectifier means connected across said device for passing current in the opposite direction through said line during the intervening opposite polarity half cycles of voltage on the line, a saturable core, means responsive to saturation of said core in a predetermined sense for applying a gating signal to said device, a winding inductively related to said core, a circuit connected across said device and responsive to voltage half cycles thereacross of said predetermined polarity for driving said core toward saturation in said predetermined sense, said circuit including said winding and series rectifier means poled to pass current during said predetermined polarity half cycles, means for biasing said core toward saturation in the opposite sense, means providing a reference signal representing a maximum desired motor current value, means providing a second signal responsive to the motor current, and means responsive to said reference and second signals for applying to said core magnetic control forces having respective components due to said reference and second signals, said components being oppositely related to each other, said component due to said reference signal acting in a direction tending to saturate said core in said predetermined sense.

10. In a control system for a polyphase alternating current motor having an input voltage line for each phase of the motor, a plurality of regulating systems, one for each of said lines, each of said regulating systems comprising a gateable semiconductor device having a load current path connected in series with its associated line, through which device power is supplied to the motor when the device is gated, said device when ungated blocking current flow therethrough, said device being gateable during half cycles of predetermined polarity of the voltage on its associated line to a unidirectional conductive state in response to a gating signal, a saturable core, means responsive to the saturation of said core in a predetermined sense for applying a gating signal to said device, a winding inductively related to said core, a circuit including said winding connected across said device and responsive to voltage across the device for driving said core toward saturation, means providing a reference signal representing a desired motor current value, means providing a second signal responsive to motor current, and means responsive to said reference and second signals for applying to said core magnetic control forces having respective components due to said reference and second signals, said components being oppositely related to each other, said component due to said reference signal acting in a direction tending to saturate said core in said predetermined sense.

11. In a control system for a polyphase alternating current motor having an input voltage line for each phase of the motor, a plurality of regulating systems, one for each of said lines, each of said regulating systems comprising a gateable semiconductor device having a load current path connected in series with its associated line, through which device power is supplied to the motor when the device is gated, said device when ungated blocking current flow therethrough, said device being gateable during half cycles of predetermined polarity of the voltage on its associated line to a unidirectional conductive state in response to a gating signal, a saturable core, means responsive to the saturation of said core in a predetermined sense for applying a gating signal to said device, a winding inductively related to said core, a circuit connected across said device and responsive to voltage half cycles thereacross of said predetermined polarity for driving said core toward saturation in said predetermined sense, said circuit including said winding and series rectifier means poled to pass current during said predetermined polarity half cycles, means for driving said core toward saturation of said predetermined sense in accordance with a reference quantity, and means responsive to motor current for driving said core toward saturation in the opposite sense.

12. In a control system for a polyphase alternating current motor having an input voltage line for each phase of the motor, a plurality of regulating systems, one for each of said lines, each of said regulating systems comprising a gateable semiconductor device having a load current path connected in series with its associated line, through which device power is supplied to the motor when the device is gated, said device when ungated blocking current flow therethrough, said device being gateable during half cycles of predetermined polarity of the voltage on its associated line to a unidirectional conductive state in response to a gating signal, rectifier means connected across said device for passing current in the opposite direction through said associated line during the intervening opposite polarity half cycles of voltage on the line, a saturable core, means responsive to saturation of said core in a predetermined sense for applying a gating signal to said device, a winding inductively related to said core, a circuit connected across said device and responsive to voltage half cycles thereacross of said predetermined polarity for driving said core toward saturation in said predetermined sense, said circuit including said winding and series rectifier means poled to pass current during said predetermined polarity half cycles, means for biasing said core toward saturation in the opposite sense, means providing a reference signal representing a maximum desired motor current value, means providing a second signal responsive to the motor current, and means responsive to said reference and second signals for applying to said core magnetic control forces having respective components due to said reference and second signals, said components being oppositely sensed with respect to each other, said component due to said reference signal acting in a direction tending to saturate said core in said predetermined sense.

13. In a control system for an alternating current motor having input power lines for the receipt of alternating supply voltage, a semiconductor device in series in one of said power lines to said motor, through which device power is supplied to the motor, said semiconductor device having switching characteristics responsive to a gating signal, regulating means including a saturable core, means for driving said core towards saturation in a predetermined sense during predetermined polarity half cycles of voltage on said one power line, said regulating means providing a gating signal to said semiconductor device depending upon the flux condition of said core at the beginning of said half cycles of predetermined polarity, means for driving said core towards saturation in the opposite sense when the line-to-line voltage between said one power line and the next adjacent power line is of opposite polarity, means for limiting the driving of said core towards saturation in said opposite sense to the interval when the instantaneous line-to-line voltage exceeds a predetermined relationship to its peak value, biasing means for biasing the core to saturation in said predetermined sense, and means responsive to current supplied to said motor for limiting the motor current, the latter means including means for opposing said biasing means in response to motor current.

14. The combination as in claim 13 wherein the predetermined relationship between the instantaneous line-to-line voltage and its peak value is selected to be one-half.

15. In a control system for an alternating current motor having input power lines for the receipt of alternating supply voltage, a semiconductor device in one of said power lines to said motor, through which device power is supplied to the motor, said semiconductor device having switching characteristics responsive to a gating signal, regulating means including a saturable core, means for driving said core towards saturation in a predetermined sense during predetermined polarity half cycles of voltage on said one power line, said regulating means requiring a greater volt-time integral to saturate said core in said predetermined sense than the volt-time integral taken across the semiconductor device during a completely blocked half-cycle of line voltage by said device, said regulating means providing a gating signal to said semiconductor device depending upon the flux condition of said core at the beginning of said half cycles of predetermined polarity, means for driving said core towards saturation in the opposite sense during the intermediate half cycles of line voltage, biasing means for biasing the core to saturation in said predetermined sense, and means responsive to current supplied to said motor for limiting the motor current, the latter means including means for opposing said biasing means in response to motor current.

References Cited by the Examiner
UNITED STATES PATENTS

| | | | |
|---|---|---|---|
| 2,594,022 | 4/52 | Horton | 317—36 |
| 2,722,649 | 11/55 | Immel et al. | 318—227 |
| 2,884,578 | 4/59 | Bradburn et al. | 318—434 |
| 2,977,523 | 3/61 | Cockrell | 318—331 |

OTHER REFERENCES

Controlled Rectifiers Drawing A.C. and D.C. Motors, by W. R. Seegmiller, Electronics, Nov. 13, 1959, pages 73–75.

JOHN F. COUCH, *Primary Examiner.*

ORIS L. RADER, *Examiner.*